(12) United States Patent
Rose et al.

(10) Patent No.: US 12,024,819 B2
(45) Date of Patent: Jul. 2, 2024

(54) COMPOSITE STRUCTURES AND METHODS OF PREPARATION

(71) Applicant: COOLEY GROUP HOLDINGS, INC., Pawtucket, RI (US)

(72) Inventors: Alfredo P. Rose, West Warwick, RI (US); Ming Wei, Cranston, RI (US)

(73) Assignee: COOLEY GROUP HOLDINGS, INC., Pawtucket, RI (US)

( * ) Notice: Subject to any disclaimer, the term of this patent is extended or adjusted under 35 U.S.C. 154(b) by 57 days.

(21) Appl. No.: 17/657,518

(22) Filed: Mar. 31, 2022

(65) Prior Publication Data
US 2022/0314560 A1    Oct. 6, 2022

Related U.S. Application Data

(60) Provisional application No. 63/168,858, filed on Mar. 31, 2021.

(51) Int. Cl.
| | |
|---|---|
| D06N 3/18 | (2006.01) |
| B29C 70/00 | (2006.01) |
| B29C 70/22 | (2006.01) |
| D06N 3/00 | (2006.01) |
| D06N 3/14 | (2006.01) |
| B29K 75/00 | (2006.01) |
| B29K 105/08 | (2006.01) |
| B29K 267/00 | (2006.01) |
| B29L 22/02 | (2006.01) |

(52) U.S. Cl.
CPC ........... *D06N 3/186* (2013.01); *B29C 70/003* (2021.05); *B29C 70/22* (2013.01); *D06N 3/0006* (2013.01); *D06N 3/0036* (2013.01); *D06N 3/14* (2013.01); *B29K 2075/00* (2013.01); *B29K 2105/0845* (2013.01); *B29K 2267/003* (2013.01); *B29K 2995/0077* (2013.01); *B29K 2995/0081* (2013.01); *B29L 2022/02* (2013.01)

(58) Field of Classification Search
None
See application file for complete search history.

(56) References Cited

U.S. PATENT DOCUMENTS

| | | |
|---|---|---|
| 6,148,871 A | 11/2000 | Hassell et al. |
| RE39,176 E | 7/2006 | Dutt |
| 2004/0161990 A1 | 8/2004 | Leighton et al. |
| 2008/0164127 A1 | 7/2008 | Hawkins |
| 2012/0058294 A1 | 3/2012 | Todt et al. |
| 2016/0121575 A1 | 5/2016 | Higuchi et al. |
| 2016/0237227 A1 | 8/2016 | Baba |
| 2016/0326690 A1 | 11/2016 | Rozant et al. |

*Primary Examiner* — Arti Singh-Pandey
(74) *Attorney, Agent, or Firm* — Lando & Anastasi, LLP

(57) ABSTRACT

A composite includes a heavy Leno weave fabric, a first resin coating, and a second resin coating. The heavy Leno weave fabric has a first side and a second side. The fabric is characterized by yarns having a denier number of at least about 1,300 in both warp and weft directions. The fabric defines a pore structure. The first resin coating is on the first side of the heavy Leno weave fabric. The second resin coating is on the second side of the heavy Leno weave fabric. The first and second resin coatings are bound to each other through the fabric via the pore structure.

20 Claims, 4 Drawing Sheets

COMPOSITE STRUCTURES AND METHODS OF PREPARATION

CROSS-REFERENCE TO RELATED APPLICATION

This application claims the benefit under 35 U.S.C. § 119(e) to U.S. Provisional Patent Application Ser. No. 63/168,858, titled "COMPOSITE STRUCTURES AND METHODS OF PREPARATION" and filed on Mar. 31, 2021, the entire disclosure of which is hereby incorporated herein by reference in its entirety for all purposes.

FIELD OF DISCLOSURE

Aspects relate generally to technical textile products and, more specifically, to high-performance polymeric composite materials for various applications and methods of making the same.

BACKGROUND

Leno weave fabrics are widely known in the textile industry. Generally sheer and open in nature, Leno weave fabrics are formed by twisting two or more warp yarns around weft yarns.

Conventional Leno weave fabrics are largely characterized by lower puncture resistance, tensile strength and/or tear strength than solid woven fabrics and therefore may not meet the material requirements for various specified end-use applications.

Composite materials are commonly made from solid woven fabric, but the manufacturing processes are intensive and can deteriorate various fabric properties. Solvent-based tie coats are often required to bond certain materials, including thermoplastic polyurethane (TPU), onto the solid woven fabric. The associated chemicals and applied heat weakens the fabric. The hazardous waste produced which requires special disposal is also undesirable.

SUMMARY

In accordance with one or more aspects, a composite is disclosed. The composite may comprise a heavy Leno weave fabric having a first side and a second side, the fabric characterized by having yarns of at least about 1,300 denier in both warp and weft directions, the heavy Leno weave fabric defining a pore structure. The composite may further comprise a first resin coating on the first side of the heavy Leno weave fabric and a second resin coating on the second side of the heavy Leno weave fabric, wherein the first and second resin coatings are bound to each other through the heavy Leno weave fabric via the pore structure.

In accordance with one or more aspects, a product having a surface formed from a composite as described herein is disclosed.

In accordance with one or more aspects, a method of forming a composite is disclosed.

The method may comprise coating resin onto a heavy Leno weave fabric having a first side and a second side, the heavy Leno weave fabric defining a pore structure and characterized by a yarn denier number of at least about 1,300.

In accordance with one or more aspects, a method of forming a composite is disclosed. The method may comprise providing a first heavy Leno weave fabric having a first side and a second side, the first side having a resin coating, providing a second heavy Leno weave fabric having a first side and a second side, the first side having a resin coating, and applying a layer of resin between the second side of the first heavy Leno weave fabric and the second side of the second heavy Leno weave fabric, whereby the layer of resin bonds with the first and second resin coatings via pore structures defined by the first and second heavy Leno weave fabrics.

The disclosure contemplates all combinations of any one or more of the foregoing aspects and/or embodiments, as well as combinations with any one or more of the embodiments set forth in the detailed description and examples.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
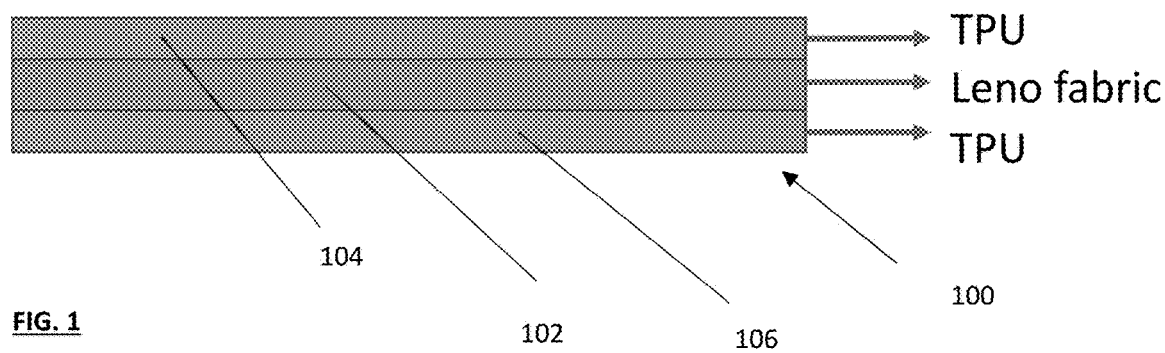
FIG. 1 is a cross-sectional schematic of a three-layered composite in accordance with one or more embodiments of the present disclosure.

The present disclosure provides composites characterized by equal or improved material properties relative to known composites. The present disclosure also provides methods of making various composites that are more preferable and efficient than conventional manufacturing techniques.

In accordance with one or more embodiments, heavy Leno woven fabrics are disclosed. These heavy leno woven fabrics may replace conventional solid woven fabrics in various composite materials. Beneficially, adhesion between the heavy leno woven fabric and applied coatings may be achieved without use of tie coats while still meeting or exceeding various mechanical and material property requirements for a given application. The associated manufacturing techniques enable the formation of technical textile products for various industrial and military markets.

In accordance with one or more embodiments, the disclosed composites may be used in a variety of applications including but not limited to primary and secondary containment solutions for fuel, oil, and chemicals, booms, waterproofing solutions, inflatables including inflatable boats such as military combat raiding craft (CRC), doors and dock shelters such as for trucking and warehouse applications, water protection applications including floating covers, bladder tanks, floating baffles, baffle curtains for underground reservoirs, and covers or floors for tanks and ponds, and roofing including commercial and RV or mobile storage. The composites may generally be pliable and highly resistant to saltwater, extreme weather, abrasions and punctures. In at least some embodiments, the composites may be imparted with flame-retardancy, antibacterial and/or antifungal properties.

The disclosed features and aspects herein are not limited to the details of construction and the arrangement of components set forth in the following description or illustrated in the drawings. One or more aspects of the present disclosure is capable of other embodiments and of being practiced or of being carried out in ways other than in the manner explicitly described herein.

In accordance with one or more embodiments, a composite may include a heavy Leno style fabric and one or more resin coatings. The heavy Leno weave fabric may be the base or substrate for the composite. In some embodiments, resin polymers can be applied to one or both sides of a heavy Leno style fabric to make a resilient and strong composite for various industrial or military applications. In at least some embodiments, the heavy Leno style fabric may be a heavy Leno fabric as described herein.

Leno fabrics may generally be characterized by an open pore structure, but various mechanical and/or physical properties may vary based on the weight of the Leno fabric. In accordance with one or more embodiments, the porosity of heavy Leno style fabrics may be used to good advantage in that the heavy Leno style fabrics allow polymers of a coating on one side to penetrate and freely pass through to the opposite side while also providing desired physical properties as described herein. As such, a polymer layer applied to one side may connect with a polymer layer applied to the opposite side of the fabric to hold the fabric tightly between the polymer layers. A strong and/or true bond therebetween results from the inherent strength of polymer binding. The use of heavy Leno style fabrics may therefore avoid the expensive and undesirable tie coat processing of solid woven fabrics which is conventionally used for increasing the adhesion of polymer coatings to solid woven fabrics. Beneficially, the mechanical and/or physical properties associated with the heavy Leno style fabric is preserved. Without adding one or more tie coat layers to the base fabric, the production time and cost of the composite is greatly reduced, the production is more efficient, the production is characterized by superior properties, and the production is environmentally friendly because there are no solvents employed for tie coat processing.

In addition, for some polymers which have very low surface energy and are therefore very challenging to bond to base fabrics even with tie coats, for example, polyvinylidene fluoride (PVDF), it is a significant advantage to use heavy Leno style fabrics as disclosed herein.

In accordance with at least some non-limiting embodiments, no tie coat is used in the disclosed composites or methods of manufacture. Current state of the art techniques uses tie-coats to adhere plastic resin coatings to dense woven fabrics, for example, drop-stitch fabrics as disclosed in U.S. Patent Application Publication No. 2017/0313027 to the present Applicant.

In accordance with one or more embodiments, a composite may include a heavy Leno weave fabric and one or more resin coatings. The heavy Leno weave fabric generally has a first side and a second side. The heavy Leno weave fabric defines a pore structure as discussed herein between the first and second sides. The pore structure may interconnect the first and second sides. A first resin coating may be on the first side of the heavy Leno weave fabric, and a second resin coating may be on the second side of the heavy Leno weave fabric. The first and second resin coatings may be bound to each other through the fabric via the pore structure.

In accordance with one or more embodiments, a composite may include two or more bound layers. In some embodiments, the composite consists essentially of the heavy Leno weave fabric layer and the first polymer coating. In some non-limiting embodiments, the composite consists essentially of the heavy Leno weave fabric layer, the first polymer coating, and the second polymer coating.

In accordance with one or more embodiments, a composite may include any number of layers, including base fabric layers and coatings. The various fabric layers and coatings can be applied in series via an additive approach, or a composite including various fabric layers and coatings may be manufactured simultaneously. The construction generally involves bonding fabric layers with coatings to provide a strong composite having desired properties.

For example, in some non-limiting embodiments, a composite may include five or more layers. In some embodiments, the composite comprises the heavy Leno weave fabric layer, the first coating, and the second coating, a second heavy Leno weave fabric having a first side adhered to the second coating, and a third coating on a second side of the second heavy Leno weave fabric. In some embodiments, the composite consists essentially of a heavy Leno weave fabric layer, a first coating, a second coating, a second heavy Leno weave fabric having a first side adhered to the second coating, and a third coating on a second side of the second heavy Leno weave fabric.

In accordance with one or more embodiments, a base fabric for the composite may be selected in terms of its material of construction, yarn denier and porosity so that the resulting composite has desired properties. These various parameters have trade-offs and impart different properties in terms of strength, resistance, and weight of the fabric. For example, a higher denier fabric may be stronger and more tear and/or puncture resistant but may be heavier and/or less porous.

In various non-limiting embodiments, the fabric may include natural materials such as cotton, nylon, polyester (PET), fiberglass, a para-aramid synthetic fiber such as Kevlar® (a registered trademark of E. I. du Pont de Nemours and Company) and its variants, elastomeric yarns, carbon, basalt, other materials, or any combination thereof suitable for an intended purpose. The yarns may generally be round or flat.

In general, the yarns that make up the fabric may be characterized by a denier number. It is possible to use two or more yarns per end in either warp or weft direction in order to get a denier number that is a multiple of the value of the individual yarns.

In various embodiments, the yarns of the fabric may have a denier of at least 1,000 denier. In some embodiments, the yarns of the fabric have a denier of at least 1,100 denier. In some embodiments, the yarns of the fabric have a denier of at least 1,200 denier. In some embodiments, the yarns of the fabric have a denier of at least 1,300 denier. In some embodiments, the yarns of the fabric have a denier of at least 1,400 denier. In some embodiments, the yarns of the fabric have a denier of at least 1,500 denier. In some embodiments, the yarns of the fabric have a denier of at least 2,000 denier. In some embodiments, the yarns of the fabric have a denier of at least 2,500 denier. In some embodiments, the yarns of the fabric have a denier of at least 3,000 denier. In some embodiments, the yarns of the fabric have a denier of at least 4,000 denier. In some embodiments, the yarns of the fabric have a denier of at least 5,000 denier. In some embodiments, the yarns of the fabric have a denier of at least 6,000 denier.

In various embodiments, the fabric may be defined by a substantially open pore structure. The porosity of the fabric is selected to allow the coatings on either side of the fabric to extend into the pores and to be secured to each other via the pore structure as described herein. In some embodiments, the coatings on either side of the fabric are bound to each other in pores of the fabric. The porosity of the fabric must not be so great that it undesirably weakens the fabric, and thus the final composite. The porosity of the fabric must not be too small to achieve a good adhesion. In some embodiments, the pore structure of the fabric is at least 15% open. In some embodiments, the pore structure of the fabric is between 20% open and 40% open, for example 30% open.

In various non-limiting embodiments, the yarn denier and/or number of yarns in the fabric may affect the porosity of the fabric. Increasing the number of picks, yarns and/or denier decreases the porosity of the fabric. Decreasing the number of picks, yarns and/or denier increases the porosity of the fabric.

In some non-limiting embodiments, the fabric includes at least 10 picks per inch in the warp direction and at least 7 picks per inch in the weft direction, i.e. 10×7 or 10×9. In some embodiments, each yarn is twisted. In some embodiments, each pick includes more than one yarn or end. In some embodiments, each pick includes 2 yarns, 3 yarns, or more. In some specific non-limiting embodiments, the heavy Leno weave fabric includes at least 10 picks of at least about 2,000 denier yarn in a warp direction, and at least 7 picks of at least about 3,000 denier yarn in a fill direction. In some embodiments, the heavy Leno weave fabric includes 3 yarns or ends per pick and thus at least 30 yarns or ends of 2,000 denier in a warp direction, and at least 7 picks of 6,000 denier yarn in a fill direction. In some embodiments, the picks in the fill direction consists of two 3,000 denier yarns instead of single 6,000 denier yarns. This type of weaving allows for about 15% to about 40% open area in the fabric that will allow applied resin to fill the open area to through bond from one resin side to the other.

In various embodiments, the overall weight of the fabric may be selected for a suitable application. In some specific non-limiting embodiments, the fabric is a heavy Leno weave fabric having a weight between 12 and 17 ounces per square yard (osy). In some specific non-limiting embodiments, the fabric is a heavy Leno weave fabric having a weight between 13 and 15 ounces per square yard. In some embodiments, the weight of the fabric is greater than 20 ounces per square yard.

In various embodiments, the overall weight of the composite including base fabric and coatings may meet various specification requirements for an intended application.

In accordance with one or more embodiments, the heavy Leno weave fabric may include a double pick rip stop feature. Ripstop is a well-known textile fiber-weaving technique that makes finished goods more durable and more resistant to tearing and ripping. Typically, the construction is reinforced with thick and strong yarns which are interwoven at regular intervals in a crosshatch pattern.

In accordance with one or more embodiments, the Leno weave fabric may use high tenacity fibers to reduce the weight.

In accordance with one or more embodiments, various desired polymer coatings may be applied to the base fabric. Polymers and their associated material properties are known to those of skill in the relevant art and can be selected based on the demands of an intended application. In at least some specific, non-limiting embodiments, the polymer coating may include synthetic polymers, such as aliphatic or semi-aromatic polyamides including nylon. In at least some specific, non-limiting embodiments, the coating may include a urethane-based coating. In some embodiments, the polymer coating on the heavy Leno weave fabric may include thermoplastic polyurethane (TPU), polyvinylidene fluoride (PVDF), synthetic rubbers (CSM) such as chlorosulfonated polyethylene (CSPE), reactive polyurethane (PUR), ethylene-vinyl acetate (EVA), polyethylene terephthalate (PET), polyvinyl chloride (PVC), polyethylene, polypropylene, thermoplastic olefin (TPO), or another material.

In accordance with one or more embodiments, various techniques for applying coatings to fabric layers are widely known to those skilled in the textile arts. These may include but are not limited to extrusion, lamination, dipping, saturation and coating operations. In some embodiments, a polymer coating may be applied as a resin coating. In some embodiments, a polymer resin may be extruded on the fabric base. In other embodiments, a polymer resin laminate sheet may be laminated on the fabric base. The term coating may be used generally throughout herein without limiting its mode of application. For example, the term coating may be used in connection with an extruded polymer layer.

In some embodiments, a composite includes a fabric base with first and second TPU coatings. In such non-limiting embodiments, the first TPU coating and the second TPU coating each has a weight of between about 5 and 50 ounces per square yard, e.g. 10, 20, 30, 40 or 50 ounces per square yard, of the heavy Leno weave fabric on at least a section of the composite.

In accordance with one or more embodiments, a coating layer may include one or more additives in order to impart desired properties to the composite. In some embodiments, one or more coatings may include a processing aid, filler, heat stabilizer, UV stabilizer, pigment, or colorant.

Beneficially, prior to coating the fabric with the resin to form a composite of the present disclosure, it is not necessary to apply a tie coat between the fabric and the coating. Instead, the resin layers bind to each other through the pore structure of the fabric. Applying a tie coat to the fabric tends to deteriorate the fabric because of the involved solvents and subsequent processing of the tie coat such as to evaporate solvent and cure. Because no tie coat is applied to the fabric, in some embodiments, the material properties of the fabric are maintained by up to 90% or greater in the composite product. In addition, the total production time can be reduced by up to 70%.

In some embodiments, no tie coat is needed between the heavy Leno weave fabric and one or more resin coatings. In some embodiments, there is no tie coat between a first TPU coating and the heavy Leno weave fabric, and there is no tie coat between a second TPU coating and the heavy Leno weave fabric. In some embodiments, there is no tie coat between a first PVDF coating and the heavy Leno weave fabric, and there is no tie coat between a second PVDF coating and the heavy Leno weave fabric.

In accordance with one or more embodiments, the coating layers on either side of the fabric meet in the pores of the fabric and are bonded together within the pores to hold the fabric therebetween.

In accordance with one or more embodiments, various material and physical properties of the resulting composites meet or exceed specification requirements for various end-use applications. Such properties include but are not limited to puncture resistance, air holding capability, tensile strength and tear strength. In at least some embodiments, various material and physical properties of the resulting composites meet or exceed the performance of comparable composites made with a conventional solid weave fabric base.

The composites described herein are useful for forming a variety of high-performance and technical textile products. Because of the improved properties of the composites of the present disclosure, the composites may be used for forming a variety of products that were not possible with previous composites. In some embodiments, the product includes an inflatable portion. In some specific non-limiting embodiments, the product is a containment structure, an inflatable boat, a portable tank, an oil boom, or a door.

In accordance with one or more embodiments, a method of forming a composite includes coating a polymer resin onto a heavy Leno weave fabric having a first side and a second side. The heavy Leno weave fabric defines a pore structure and may be characterized by a yarn denier number of at least about 1,300, e.g. 2,000.

In some embodiments, coating the resin onto the heavy Leno weave fabric comprises forming a first resin coating on the first side of the heavy Leno weave fabric and a second resin coating on the second side of the heavy Leno fabric. The first resin coating and second resin coating are bound to each other through the open pore structure. The first and second coatings may be applied to the fabric separately or simultaneously.

In accordance with one or more embodiments, the stability of a heavy Leno weave fabric may be augmented after weaving. For example, the heavy Leno weave fabric may be passed through a trough of an aqueous stabilizing solution, saturating the heavy Leno weave fabric, after which the fabric may be dried. For example, an inline satuaration process of the aqueous solution holds the fabric in place and aids in achieving adhesion of the resin. Equipment for an inline saturation unit operation may be attached to a fabric loom for applying an aqueous solution to the fabric. After the fabric has dried, it may be extrusion coated to form a composite as described herein.

In some embodiments, the method includes extruding the resin. In some embodiments, extruding the resin includes heating an extrusion intake zone for the resin to a temperature of between 330° F. and 380° F. In some embodiments, extruding the resin includes heating a die zone to a temperature of 380° F. Extrusion processes are widely known to those in the art.

In accordance with one or more embodiments, the coating step is substantially solvent-free. In accordance with one or more embodiments, the overall composite manufacturing process is substantially solvent-free because no tie coats are implemented. Other coating techniques including but not limited to extrusion, such as hot melt or other extrusion technique, and lamination are widely known to those skilled in the art.

The methods of the present disclosure are useful for forming multilayered composites. In some embodiments, the multilayered composite includes at least three layers. For example, methods of the present disclosure are useful for forming three-layered composites, five-layered composites, or composites having another number of layers. FIG. 1 shows a composite 100 that includes a fabric layer 102, a first resin layer 104, and a second resin layer 106.

Figure 2:
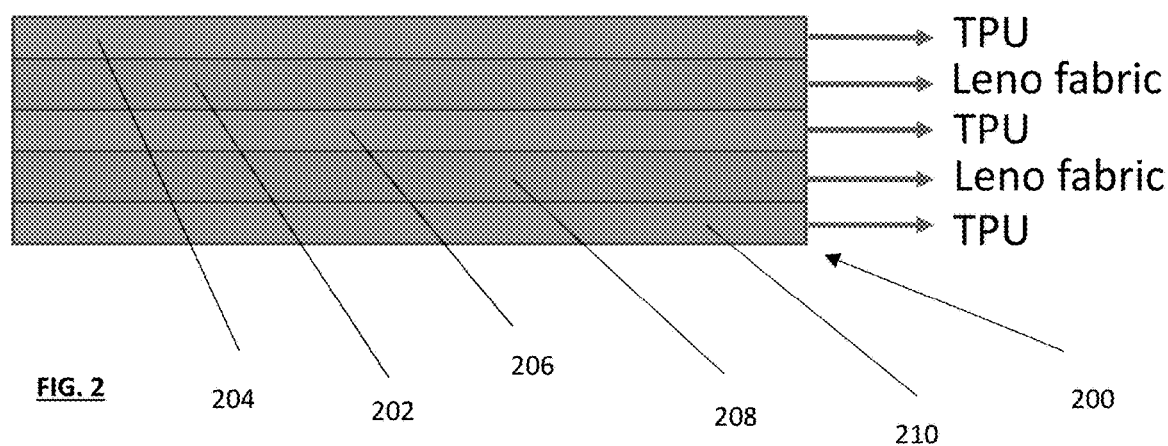
FIG. 2 is a cross-sectional schematic of a five-layered composite in accordance with one or more embodiments of the present disclosure.

In some embodiments, the multilayered composite includes at least five layers. FIG. 2 shows a composite 200 that includes a first fabric layer 202, a first resin layer 204 on a first side of the first fabric layer 202, a second resin layer 206 on a second side of the first fabric layer 202, a second fabric layer 208 adjacent the second resin layer 206 so the second resin layer 206 is on a first side of the second fabric layer 208, and a third resin layer 210 on a second side of the second fabric layer 208.

As discussed above, a multi-layer composite may be manufactured simultaneously or in an additive process. In some embodiments, sub-composite structures may be formed and then further processed to form a final composite structure.

In some non-limiting embodiments, a method of forming a composite may include providing a first heavy Leno weave fabric having a first side and a second side, the first side having a resin coating. The method may further include providing a second heavy Leno weave fabric having a first side and a second side, the first side having a resin coating. The method may still further include applying a layer of resin between the second side of the first heavy Leno weave fabric and the second side of the second heavy Leno weave fabric, whereby the layer of resin bonds with the first and second resin coatings via pore structures defined by the first and second heavy Leno weave fabrics.

The resin coating and/or resin layers may be thermoplastic polyurethane (TPU). The TPU layer may be extruded between the second sides of the first and second heavy Leno weave fabrics as the first and second heavy Leno weave fabrics are fed together in an online extrusion process.

In some specific non-limiting embodiments, a five layered composite may be formed by coating resin onto one side of a fabric, cutting the resulting coated fabric to form a first piece of coated fabric and a second piece of coated fabric, placing the first piece of coated fabric on top of the second piece of coated fabric with the fabric backs facing, and applying a layer of resin between the fabric backs of the first and second pieces of coated fabrics. The resin may be applied by any suitable method, such as coating, extrusion, or lamination.

In some non-limiting embodiments, applying the coating includes co-extruding a processing aid, filler, heat stabilizer, UV stabilizer, pigment or a colorant with the resin.

Figure 3:
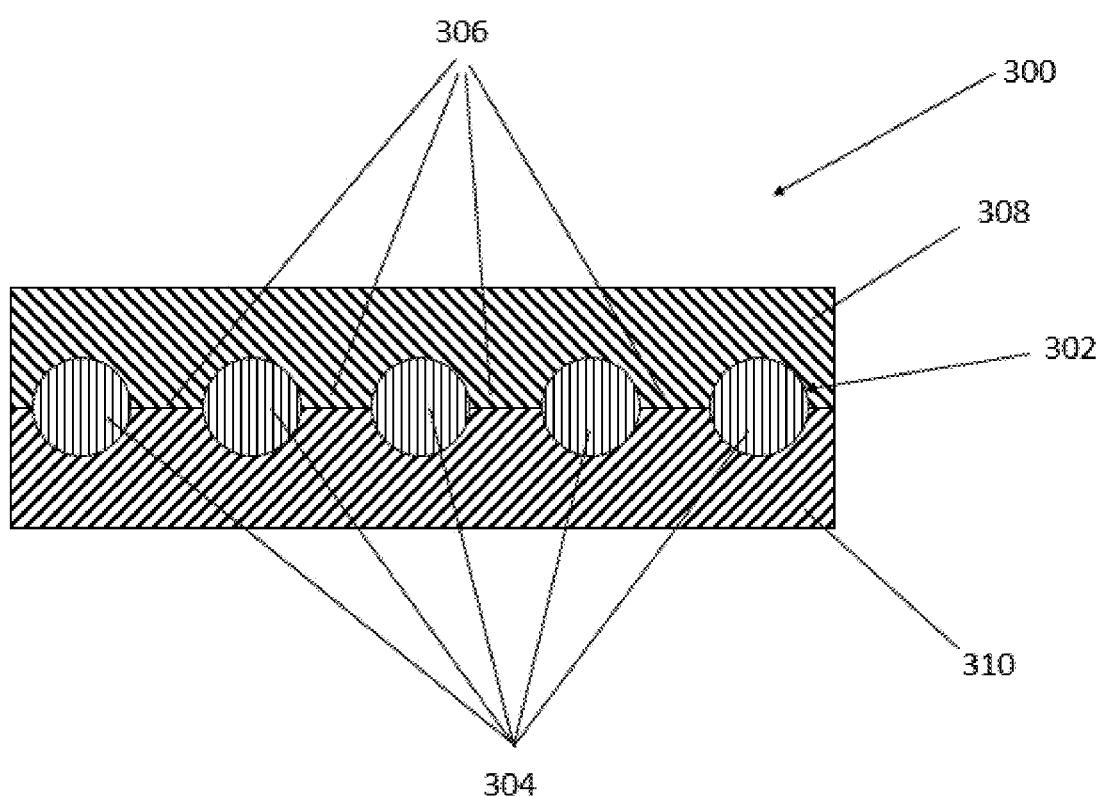
FIG. 3 is a cross-sectional schematic of two resin layers bonding in a pore structure of a fabric in accordance with one or more embodiments of the present disclosure.

FIG. 3 is a cross-sectional schematic showing bonding of resin in a composite, indicated generally at 300. The composite 300 includes a fabric layer, indicated generally at 302, that has a plurality of yarns 304. Adjacent yarns 304 define open pores 306 in fabric layer 302. The pores 306 together define a pore structure of the fabric layer 302. The composite includes a first resin layer 308 and a second resin layer 310 that bond to each other in the pores 306 of the fabric layer around yarns 304.

Figure 4A:
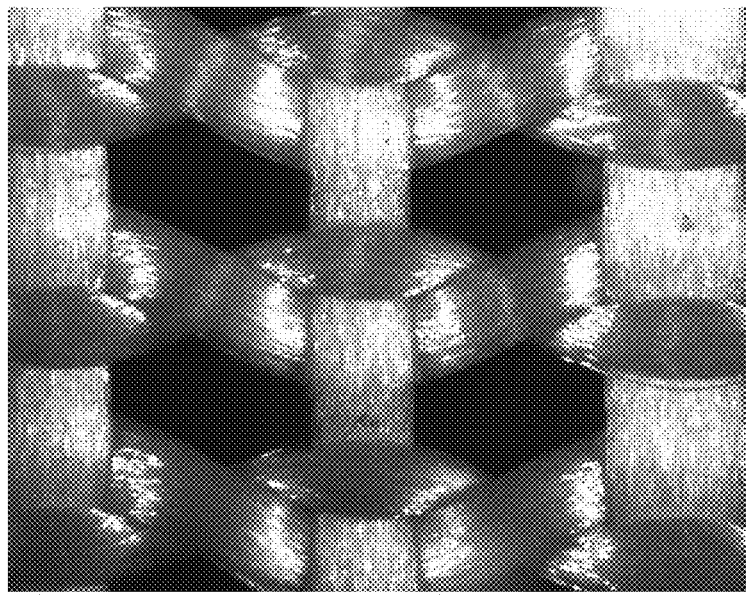
FIGS. 4A-4D are images of exemplary fabrics for use in accordance with one or more embodiments of the present disclosure.
Figure 4B:
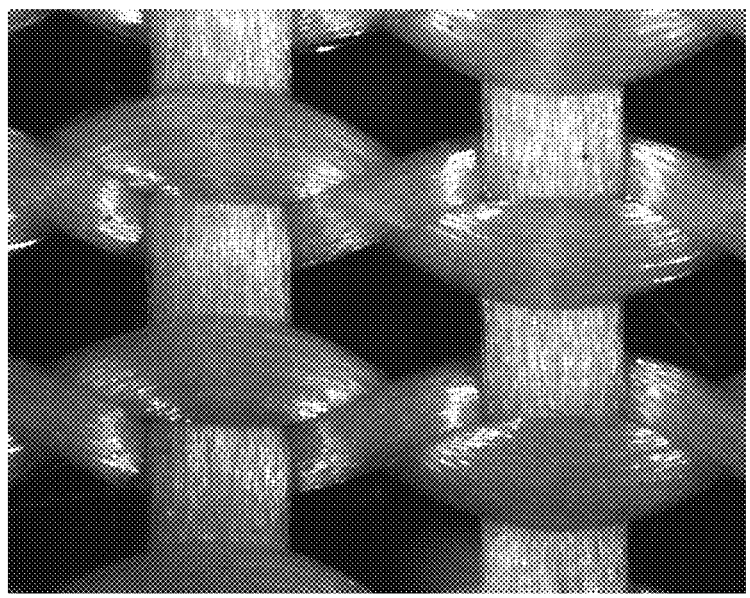
Figure 4C:
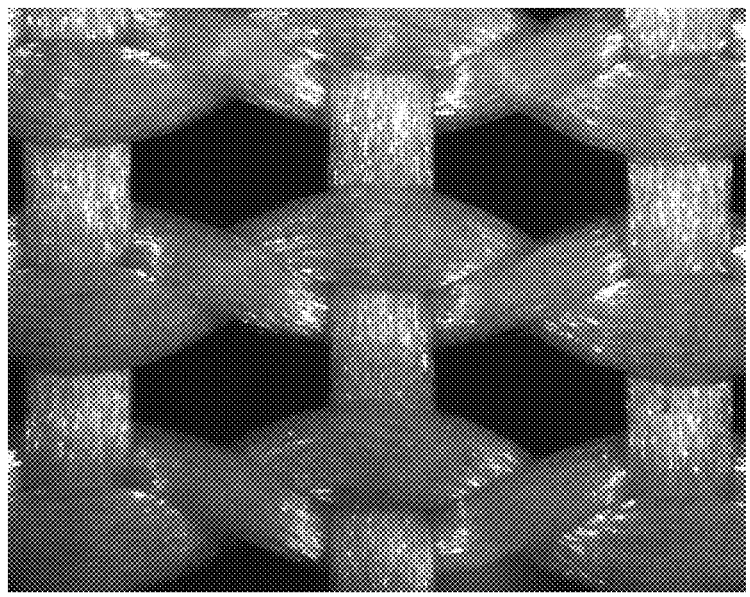
Figure 4D:
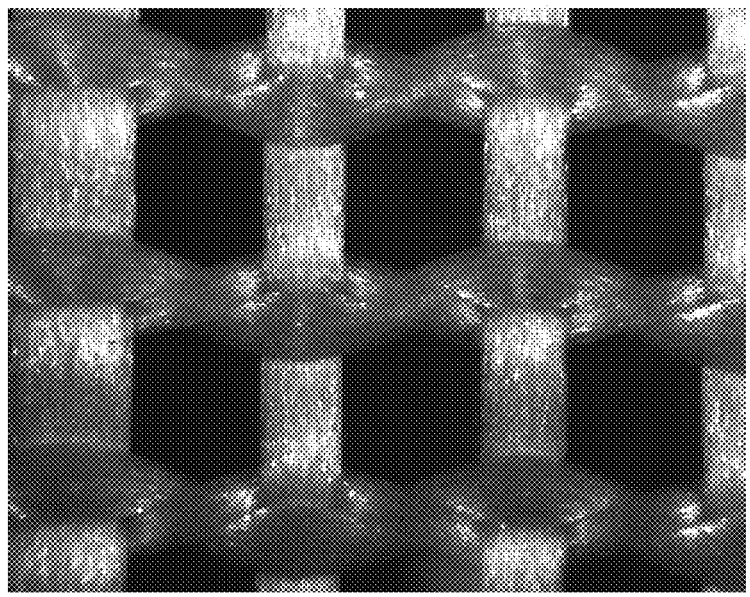

FIGS. 4A-4D show exemplary fabrics for use in embodiments of the present disclosure. FIG. 4A shows a Leno fabric having an open area of about 20%. FIG. 4B shows a Leno fabric having an open area of about 27%. FIG. 4C shows a Leno fabric having an open area of about 26%. FIG. 4D shows a Leno fabric having an open area of about 31%. Coatings applied to first and second sides of the Leno fabrics would bond in the defined pore structures as illustrated herein in accordance with various embodiments.

The function and advantages of these and other embodiments can be better understood from the following examples. These examples are intended to be illustrative in nature and are not considered to be limiting the scope of the invention.

EXAMPLES

Testing Methodology
Materials

Three different types of heavy Leno style polyester (PET) fabrics with the following construction were obtained from Cooley Group: A) 3-ply 2000 denier PET fiber at warp direction, 3000 Denier PET fiber at fill direction, 10×9, with double pick rip stop; B) 3-ply of 2000 denier PET fiber in the warp direction, 2-ply of 3000 Denier PET yarn in the fill direction, 10×7, no double pick rip stop; and C) 3-ply of 2000 denier PET fiber at warp direction, 3000 Denier PET fiber at fill direction, 10×8, no double pick rip stop. The fabric weight is around 14-15 osy.

Thermoplastic polyurethane Elastollan 1185A (TPU) was obtained from BASF.

Preparation of Extrusion Coated Fabrics

Leno fabrics were extrusion coated with TPU on both sides on a one-inch diameter lab extruder, or a six inch diameter large-scale production extruder. Optionally, masterbatches containing processing aids, fillers, heat and/or UV stabilizers, pigments, or colorants were fed together with the resins to the extruders. Typical extrusion conditions range from 330-380° F. at the intake zone to 380° F. at the die. FIG. 1 shows the typical construction of a three-layered product.

Optionally, TPU film was extruded on one side of Leno fabrics and then the coated fabrics were slit into half followed by the extrusion of TPU film on another side of two pieces of coated fabrics to form a five layered structure. FIG. 2 shows the typical construction of a five layered product.

Peel Adhesion

The two-inch strip peel adhesion is measured by peeling TPU layer from the scrim during a tensile test following ASTM D751. An average of the five highest peaks was recorded as peel force.

RF Adhesion (Radio Frequency Welding Peel Adhesion)

Two samples (1"×6") were welded on the RF welding machine. RF adhesion was measured when peeling one from the other from the welded joint following ASTM D751. An average of the five highest peaks was recorded as peel force.

Deadload Testing

Two of 1" by 24" strips were RF welded together with 1" by 2" overlap area and then 50 pounds load was applied across the seam. The samples with load were placed into 160 F oven and the time for failure was recorded. The complete testing procedure followed ASTM D 751 Dead Load Seam Strength.

Strip Tensile Strength

The tensile strength of 1" wide and 8" long sample was tested on a tensile testing machine following ASTM D751B. The breaking strength and elongation were recorded.

Grab Tensile Testing

A sample with 4" by 6" size was pulled to its breaking point to obtain the ultimate tensile strength of the material. The procedure followed ASTM D751B.

Tongue Tear Testing

A sample with 8" by 8" size was precut and then tested with a tensile machine by measuring the force required to rupture the specimen. The procedure followed ASTM D751B.

Puncture Resistance Testing with Ball

Puncture resistance was tested by exerting a force on the 4" by 8" clamped sample with a 1" Steel Ball until the material breaks. The procedure followed ASTM D751.

Puncture Resistance Testing with Screwdriver Tip

Puncture resistance was tested by exerting a force on the 4" by 8" clamped sample with a screwdriver tip until the material breaks. The procedure followed ASTM D751.

Examples 1-3

TPU was extruded on both sides of a solid PET fabric and four types of Leno fabrics including one regular Leno fabric and 3 different types of heavy Leno fabrics A, B, and C with a 1" diameter lab extruder. The add-on weight of TPU on both sides is 8 osy. Table 1 shows the construction difference and physical properties comparison of these five different fabrics. The solid PET fabrics went through a 4 pass solvent based tie coat process to create the bonding surface for the extrusion of TPU (2 tie coat layers on each side of the fabric). Table 2 shows the properties comparison of samples made with these five different types of fabrics. As seen from Table 2, the samples made with heavy Leno style fabrics (A, B, and C) have comparable adhesion and puncture resistance as samples made with standard solid fabrics. The grab tensile strength in the warp direction and tear strength of heavy Leno fabrics showed much higher values than samples made with standard solid fabrics. Samples with regular light Leno fabric showed highest adhesion due to the largest open area of the fabrics. However, the puncture resistance and tensile strength of samples made with regular Leno fabrics are much lower than samples made with heavy Leno fabric. All of them passed deadload testing at 160 F for 8 hours with 50 pounds load. These data demonstrated that samples made with heavy denier Leno fabrics showed a significant better combination of all the properties than samples with regular leno and solid fabrics. More importantly, the use of heavy Leno fabrics avoids the expensive tie coat coating process as used in the application of solid fabrics and also saved around 70% of the complete production time.

TABLE 1

Properties of five different fabrics

| Greige Fabrics | Solid PET fabrics | Regular Leno | LENO-"A" | LENO-"B" | LENO-"C" |
|---|---|---|---|---|---|
| Weight (osy) | 11.88 | 7.14 | 13.45 | 13.78 | 13.03 |
| Denier (Warp/Fill) | 1000/2000 | 1000/2000 | 2000/3000 | 2000/3000 | 2000/3000 |
| Pick (Warp/Fill) | 9.5 × 26 | 10 × 11 | 10 × 9 | 10 × 7 | 10 × 8 |
| Ends (Warp/Fill) | 38 × 26 | 30 × 11 | 30 × 9 | 30 × 14 | 30 × 8 |
| Rip stop | N/A | Double | Double | N/A | N/A |
| Tensile Strength, 1" Strip, (Warp/Fill) | 350 ± 30/ 370 ± 80 | 330 ± 20/ 280 ± 30 | 660 ± 60/ 260 ± 25 | 560 ± 40/ 300 ± 20 | 540 ± 70/ 250 ± 7 |
| Tear Strength, Tongue (mod 8" × 8", Warp/Fill) | 415 ± 50/ 350 ± 45 | 240 ± 80/ 250 ± 20 | 220 ± 26/ 220 ± 46 | 350 ± 40/ 350 ± 40 | 190 ± 15/ 210 ± 14 |
| Puncture, 1" Steel Ball | 175 ± 4 | 450 ± 17 | 755 ± 40 | 870 ± 80 | 865 ± 45 |
| Open area (%) | <1 | 31 | 20 | 27 | 26 |

TABLE 2

Properties comparison of samples made with standard solid fabrics and Leno style fabrics.

| | Comparative Example 1 Solid PET fabrics | Comparative Example 2 Regular leno | Example 1 Leno A | Example 2 Leno B | Example 3 Leno C |
|---|---|---|---|---|---|
| Weight (osy) | 29 | 28 | 30 | 31 | 29 |
| 1" RF Adhesion, lbs/1", Face to back | 70 ± 5 | 90 ± 10 | 70 ± 10 | 70 ± 10 | 60 ± 5 |
| 2" Tape Adhesion, lbs/2", Pass 1 Pass 2 | 19 ± 2, 24*, 30 ± 2* | 43 ± 7*, 42 ± 8* | 20, 37 ± 6*, 17, 32 ± 7* | 32 ± 7*, 15 ± 3, 36 ± 6* | 32 ± 9*, 21 ± 6, 28* |
| Tensile Strength, Grab, lbs Warp/Fill | 650 ± 70/ 850 ± 90 | 460 ± 20/ 300 ± 25 | 1000 ± 16/ 70 ± 125 | 1000 ± 50/ 850 ± 50 | 1000 ± 70/ 500 ± 40 |
| Tear Strength, Tongue, lbs, Warp/Fill | 30 ± 4/ 37 ± 9 | 125 ± 10/ 110 ± 10 | 143 ± 6/ 150 ± 7 | 224 ± 40/ 224 ± 3 | 106 ± 12/ 101 ± 2 |
| Puncture, Ball, lbs | 1500 ± 50 | 850 ± 40 | 1400 ± 25 | 1600 ± 30 | 1000 ± 150 |
| Puncture, Screw, lbs | 140 ± 3 | 105 ± 15 | 180 ± 20 | 180 ± 15 | 155 ± 30 |
| Deadload 160 F./8 h @ 50 lbs | Pass | Pass | Pass | Pass | Pass |

**Failure mode is film broken and max. peak value, no* means five highest peak averaged value.

Example 4

A composite was prepared as comparative example with a traditional tight weave and the required two tie coat layers. The fabric (Comparative Example 3) was a 15.758-osy polyester fabric construction. The Comparative Example 3 included 13×15 picks per inch made up of 13×4 yarns per inch of 1000D and 15×2 yarn per inch of 2000D. This fabric went through a 2-pass solvent base tie coat to create the bonding surface for the extrusion process of TPU. Example 4 is the TPU extruded on the fabrics to form a five layered product with the construction as in FIG. 2.

The weight of the final part or thickness of the coating determines the final properties of coated fabrics. The data of Table 3 illustrates that at comparable weight, the Leno B fabric matched or significantly outperformed the solid PET fabric across a variety of performance metrics.

TABLE 3

Comparison of Comparative Example 3 and a composite including a heavy Leno fabric of the present disclosure.

| Fabrics | Comparative Example 3 Solid PET fabrics | Example 4 Leno B |
|---|---|---|
| Weight (osy) | 100 ± 2 | 100 ± 2 |
| Tape adhesion (lbs/2"), Face | 120 ± 50 | 200 ± 10 |
| Tape adhesion (lbs/2"), Back | 120 ± 50 | 170 ± 5 |
| 1" strip tensile, lbs Warp | 1320 ± 60 | 1430 ± 30 |
| 1" strip tensile, lbs Fill | 1300 ± 200 | 1280 ± 30 |
| Tear Strength, Tongue, lbs, Warp | 78 ± 2 | 600 ± 40 |
| Tear Strength, Tongue, lbs, Fill | 240 ± 20 | 700 ± 40 |

Example 5

A composite was prepared as comparative example with a traditional tight weave and the required three tie coat layers. The fabric (Comparative Example 4) was a 15.6-osy nylon/polyester fabric construction. The Comparative Example 4 included 13×15 picks per inch made up of 13×4 yarns per inch of 1050D and 15×2 yarn per inch of 2000D. This fabric went through a 3-pass solvent base tie coat to create the bonding surface for the extrusion process of TPU. Example 5 is the TPU extruded onto the both sides of Leno B fabrics. The data of Table 4 illustrates that at comparable weight, the Leno B fabric matched or significantly outperformed the solid Nylon/PET fabric across a variety of performance metrics.

TABLE 4

Comparison of Comparative Example 4 and a composite including a Leno fabric of the present disclosure.

| Fabrics | Comparative Example 4 Solid nylon/ PET fabrics | Example 5 Leno B |
|---|---|---|
| Weight (osy) | 69 ± 1 | 68 ± 1 |
| Tape adhesion, lbs/2", Face | 80 ± 10 | 120 ± 10 |
| RF adhesion, lbs/1", | 70 ± 1 | 80 ± 5 |
| Tensile Strength, Grab, lbs, Warp | 1175 ± 120 | 1210 ± 40 |
| Tensile Strength, Grab, lbs, Fill | 1160 ± 100 | 1030 ± 30 |
| Tear Strength, Tongue, lbs, Warp | 55 ± 5 | 250 ± 40 |
| Tear Strength, Tongue, lbs, Fill | 145 ± 5 | 310 ± 60 |

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives.

Those skilled in the art should appreciate that the parameters and configurations described herein are exemplary and that actual parameters and/or configurations will depend on the specific application in which the systems and techniques of the disclosure are used. Those skilled in the art should also recognize or be able to ascertain, using no more than routine experimentation, equivalents to the specific embodiments of the disclosure. It is therefore to be understood that the embodiments described herein are presented by way of example only and that, within the scope of the appended claims and equivalents thereto; the disclosure may be practiced otherwise than as specifically described.

Moreover, it should also be appreciated that the disclosure is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the disclosure as embodied in the claims. Further, acts, elements, and features discussed only in connection with one embodiment are not intended to be excluded from a similar role in other embodiments.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A composite, comprising: a Leno weave fabric having a first side and a second side, the fabric characterized by having yarns of at least 1,300 denier in both warp and weft directions, the Leno weave fabric defining a pore structure; wherein the pore structure of the Leno weave fabric is at least about 15% open to about 40% open; a first resin coating on the first side of the Leno weave fabric; and a second resin coating on the second side of the Leno weave fabric, wherein the first and second resin coatings are bound to each other through the Leno weave fabric via the pore structure without one or more tie coats.

2. The composite of claim 1, wherein the first and second resin coatings comprise thermoplastic polyurethane (TPU).

3. The composite of claim 2, wherein there is no tie coat between the first TPU coating and the Leno weave fabric, and there is no tie coat between the second TPU coating and the Leno weave fabric.

4. The composite of claim 2, wherein the composite consists essentially of the Leno weave fabric, the first TPU coating, and the second TPU coating.

5. The composite of claim 2, wherein the Leno weave fabric is a first Leno weave fabric, the composite further comprising: a second Leno weave fabric having a first side adhered to the second TPU coating; and a third TPU coating on a second side of the second Leno weave fabric.

6. The composite of claim 5, wherein there is no tie coat between the first TPU coating and the first Leno weave fabric, there is no tie coat between the second TPU coating and the first Leno weave fabric, there is no tie coat between the second TPU coating and the second Leno weave fabric, and there is no tie coat between the second-Leno weave fabric and the third TPU coating.

7. The composite of claim 2, wherein in at least a section of the composite, the first TPU coating and the second TPU coating each has a weight of between about 5 and about 50 ounces per square yard of the Leno weave fabric.

8. The composite of claim 1, wherein the Leno weave fabric includes at least 30 ends of at least 2,000 denier in a warp direction and at least 7 picks with at least 3,000 denier yarn in a fill direction.

9. The composite of claim 8, wherein the Leno weave fabric includes at least 7 picks with at least 6,000 denier yarns in the fill direction.

10. The composite of claim 1, wherein the Leno weave fabric has a weight of between about 12 and about 17 ounces per square yard.

11. The composite of claim 1, wherein at least one of the first and second coatings comprises at least one of thermoplastic polyurethane (TPU), polyvinylidene fluoride (PVDF), synthetic rubbers (CSM) such as chlorosulfonated polyethylene (CSPE), reactive polyurethane (PUR), ethylene-vinyl acetate (EVA), polyethylene terephthalate (PET), polyvinyl chloride (PVC), polyethylene (PE), polypropylene (PP), thermoplastic olefin (TPO), or another material.

12. The composite of claim 1, wherein the Leno weave fabric is a polyester (PET) fabric.

13. The composite of claim 1, wherein the Leno weave fabric comprises double pick rip stop.

14. The composite of claim 1, exhibiting a puncture resistance that meets or exceeds a specification requirement for an intended end-use application.

15. The composite of claim 1, exhibiting a strip tensile strength of at least 900 pounds in the warp direction and 500 pounds in the fill direction and a tear strength of at least 80 pounds.

16. The composite of claim 1, wherein the composite has a minimal tongue tear strength of about 500 lbs. in both warp and fill direction and the composite has a weight of about 100 ounces per square yard.

17. The composite of claim 1 wherein at least one of the first and second resin coatings comprises a processing aid, filler, heat stabilizer, UV stabilizer, pigment or colorant.

18. A product having a surface formed from the composite of claim 1.

19. The product of claim 18, wherein the product includes an inflatable portion, and wherein the product exhibits an air holding property that meets or exceeds a specification requirement for an intended end-use application.

20. The product of claim 19, wherein the product is selected from the group consisting of: a containment structure, an inflatable boat, a portable tank, an oil boom, and a door.

* * * * *